United States Patent
Zhu et al.

(10) Patent No.: US 10,590,246 B2
(45) Date of Patent: Mar. 17, 2020

(54) ACETALDEHYDE SCAVENGER TREATMENT

(71) Applicant: FORD MOTOR COMPANY, Dearborn, MI (US)

(72) Inventors: Jennifer Haijin Zhu, Ann Arbor, MI (US); Ji Zhang, Nanjing (CN); Mark Allen Dearth, Dearborn, MI (US); Timothy James Hallifax, Toorak (AU); Mica Marie Debolt, Saline, MI (US); Deborah Frances Mielewski, Ann Arbor, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 288 days.

(21) Appl. No.: 15/612,705

(22) Filed: Jun. 2, 2017

(65) Prior Publication Data

US 2017/0349716 A1 Dec. 7, 2017

Related U.S. Application Data

(60) Provisional application No. 62/346,158, filed on Jun. 6, 2016.

(51) Int. Cl.
*B29C 33/60* (2006.01)
*C08J 3/20* (2006.01)
(Continued)

(52) U.S. Cl.
CPC ............ *C08J 3/203* (2013.01); *B29C 33/60* (2013.01); *C08B 37/0012* (2013.01); *C08J 5/18* (2013.01); *C08K 5/0008* (2013.01); *C08K 5/20* (2013.01); *C08L 67/02* (2013.01); *C09D 5/033* (2013.01); *C09D 7/63* (2018.01); *C09D 7/65* (2018.01); *C09D 105/16* (2013.01); *B29C 44/02* (2013.01); *B29K 2025/06* (2013.01); *B29K 2027/06* (2013.01); *B29K 2067/046* (2013.01); *B29K 2075/00* (2013.01); *B29L 2031/3005* (2013.01); *C08G 18/4829* (2013.01);
(Continued)

(58) Field of Classification Search
CPC .......... B29C 33/56–68; C08B 37/0012; C09D 105/16
See application file for complete search history.

(56) References Cited

U.S. PATENT DOCUMENTS

2006/0141236 A1* 6/2006 Nakamura ............... C08K 5/24
428/304.4

FOREIGN PATENT DOCUMENTS

JP 2005124743 A 5/2005

OTHER PUBLICATIONS

Brent A Mrozinski, Acetaldehyde scavengers for poly)ethylene terephthalate): chemistry of reaction, capacity, and modeling of interactions, 2010.*
(Continued)

*Primary Examiner* — Alex A Rolland
(74) *Attorney, Agent, or Firm* — Vincent Mastrogiacomo; Brooks Kushman P.C.

(57) ABSTRACT

A method of forming a vehicle interior foam article, the method including applying a mold release agent onto an inner surface of a mold, delivering a solution having aldehyde scavenger(s) to the mold such that a reaction of the aldehyde scavenger(s) with the mold release agent is prevented, delivering a foam material into the mold, and casting the article.

13 Claims, 4 Drawing Sheets

(51) Int. Cl.
*C09D 5/03* (2006.01)
*C09D 7/63* (2018.01)
*C09D 7/65* (2018.01)
*C08B 37/16* (2006.01)
*C08J 5/18* (2006.01)
*C08K 5/00* (2006.01)
*C08K 5/20* (2006.01)
*C08L 67/02* (2006.01)
*C09D 105/16* (2006.01)
*B29C 44/02* (2006.01)
*B29K 25/00* (2006.01)
*B29K 27/06* (2006.01)
*B29L 31/30* (2006.01)
*C08G 18/64* (2006.01)
*B29K 75/00* (2006.01)
*B29K 67/00* (2006.01)
*C08G 101/00* (2006.01)
*C08G 18/48* (2006.01)

(52) U.S. Cl.
CPC ..... *C08G 18/4841* (2013.01); *C08G 18/6484* (2013.01); *C08G 2101/00* (2013.01)

(56) References Cited

OTHER PUBLICATIONS

Mrozinski, Brent A., "Acetaldehyde scavengers for poly(ethylene terephthalate): chemistry of reactions, capacity, and modeling of interactions", 2010, Theses and Dissertations, Paper 917.

* cited by examiner

ACETALDEHYDE SCAVENGER TREATMENT

CROSS-REFERENCE TO RELATED APPLICATIONS

This application claims the benefit of U.S. provisional Application No. 62/346,158 filed Jun. 6, 2016, the disclosure of which is incorporated in its entirety by reference herein.

TECHNICAL FIELD

The disclosure relates to a scavenger treatment preventing release of acetaldehyde from a foam material and methods of producing and using the same.

BACKGROUND

Aldehydes such as acetaldehyde (AA) are volatile organic compounds (VOCs) that are routinely released via many chemical processes occurring in nature as well as in enclosed environments. Since many parts of a vehicle interior are organic polymer materials, aldehydes may be already present in these automotive parts as a result of the manufacturing process or be generated in the parts via photooxidation and thermooxidation during and after post-manufacturing. The generated aldehydes diffuse from their source to the material surface, at which point, aldehydes are released into the cabin air.

While many different VOCs are responsible for the "new car smell," elevated AA concentrations in the cabin air are one potential source, and are both undesirable and subject to governmental scrutiny. Thus, regulations regarding acceptable AA limits in new vehicle interiors are under consideration in some countries such as China, and AA is a controlled substance in Korea.

SUMMARY

In at least one embodiment, a coating, treatment, or infusion including one or more types of aldehyde scavengers is disclosed. The coating, treatment or infusion is applied to an outer surface of a foam molded article. The scavengers, at or near the surface of the foam, prevent diffusion of aldehyde from within the article. The scavengers may include anthranilamide, alpha-cyclodextrin, MXDA, or a combination thereof.

In another embodiment, a method of applying a coating including one or more types of aldehyde scavengers on the inner side of a mold for foam casting is disclosed. The method includes applying a mold release agent and preventing a reaction between the scavengers and the mold agent. A molded foam article includes a thin outer layer including the scavengers capable of preventing diffusion of aldehyde from within the article.

In yet another embodiment, a method for forming a PUR foam by reacting AA scavenger-containing polyol with isocyanate is disclosed. The cast PUR foam contains AA scavengers in its upper or outer layer. The scavengers may include alpha-cyclodextrin, modified anthranilamide, modified MXDA, or a combination thereof.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Acetaldehyde or ethanal is a VOC with the formula $CH_3CHO$ belonging to the larger chemical family of aldehydes. AA occurs in nature and is produced on a large scale by a plethora of industries. AA is also present in tobacco smoke, smog, vehicle and factory exhausts, synthetic fragrances, and numerous commercially manufactured materials. While AA occurs outdoors, it is prevalent in indoor environments in concentrations which are up to several magnitudes higher than its typical concentrations outdoors. The main sources of exposure indoors and in other enclosed environments include building materials, laminates, fabrics, insulating materials, varnishes, paints, adhesives, plywood, particle-board, and plastic materials. Released AA, together with other VOCs such as formaldehyde HCHO, also contribute to the "new car smell" which is typical for newly manufactured automobiles and other vehicles containing foam and other plastic materials.

AA concentration may increase from exposure to oxygen, heat, UV light, or a combination thereof due to thermooxidation and photooxidation processes. As it relates to interior air of vehicles, conditions during manufacture cause oxidation and light degradation of certain components. As a result, AA is released from these components such as new vehicle seats. Additionally, normal oxidation and exposure to light over time cause AA formation and release from polymeric materials within a vehicle cabin air after manufacture, resulting in release of AA into the interior.

Just like other aldehydes, AA is an environmental toxin and a Group 1 carcinogen, according to the International Agency for Research of Cancer. Depending on the length of exposure and concentration, AA may cause acute or chronic toxicity, irritating eyes, skin, mucous membranes, throat, respiratory tract, and adversely affecting central nervous system, the brain, as well as the immune and endocrine systems. AA is also a suspect teratogen and due to its tendencies to bind to proteins causes abnormal muscle development. AA and its metabolites damage membranes of red blood cells and alter hemoglobin, thus reducing available oxygen to the cells, especially in the brain. Besides its toxicity, AA may cause essential nutrient deficiencies when the nutrients are diverted to participate in metabolism of AA to detoxify the body. Repeated exposure, even under toxic levels, may lead to increased sensitivity and a plethora of associated symptoms in some individuals.

Because of the adverse health effects of AA, other aldehydes, and other VOCs, several countries such as China have imposed regulations requiring minimal concentrations of VOCs in the vehicle interiors. Thus, it would be desirable to develop a method of eliminating the "new car smell" in vehicle interiors, as such objectionable odor is indicative of unwelcome concentrations of the VOCs, and especially aldehydes such as AA, in the vehicle cabin air. Furthermore, it would be desirable to identify a solution which would be long-term, thus preventing release of aldehydes even after the manufacture of the vehicle has been completed and while the vehicle is being used.

Several methods attempting to do the same have been identified. For example, using carbon sheets for simple adsorption of the released AA, thus disrupting the manufacturing and distribution process, has been proposed. But, it is only a short term solution. Modification of the polymer formula has been suggested. For instance, studies have been performed using in situ chemical scavengers to capture AA that is formed in poly(ethyleneterephtalate) (PET) bottles to mitigate the sweet AA taste and smell created in the PET as the PET is heated and formed, and under ambient UV exposure. Other solutions include low-activity polymerization catalysts during injection molding, removal of AA prior to injection molding by extending solid-state polymerization times, and the like. Yet, such solutions typically lead to modification of the plastic and negatively affect its mechanical and thermal properties as well as integrity of the final product's structure. Thus, there is a need for a long-term solution which would be effective without compromising properties of the plastic.

Several methods of reducing aldehyde concentration in the vehicle cabin air are identified below. While the description focuses on AA, the same methods are applicable to reduce concentrations of other aldehyde species in the cabin air. Aldehyde relates to an organic compound containing a formyl group.

In one or more embodiments, a method of reducing AA concentrations in the vehicle cabin air is disclosed. The method includes application of a solution onto a foam surface the AA diffuses out of. The solution contains scavengers which prevent AA from being released out of the foam material into the cabin air.

While the method is applicable to other materials, the discussion herein focuses on foam materials used within the interior of a vehicle. Non-limiting example types of applicable vehicles include land vehicles such automobiles, buses, vehicles for transportation of goods, motorcycles, off-road vehicles, tracked vehicles, trains, amphibious vehicles, aircrafts, space crafts, watercrafts, or the like.

The foam materials relate to solid materials having a closed-cell or open-cell structure in which gas forms discrete pockets which are either surrounded by the solid material or connected to each other. Such foams represent light-weight cellular engineering materials having good insulating properties due to low heat transfer as well as mechanical properties such as low density, high dimensional stability, high strength, low moisture absorption, high flexibility and pliability, etc. The foam materials include rigid and flexible polyurethane foams, polystyrene foams, biodegradable foams based on ethylene vinyl alcohol, polyvinyl alcohol, polycaprolactone, polylactic acid, starch, the like, or a combination thereof.

Figure 1A:
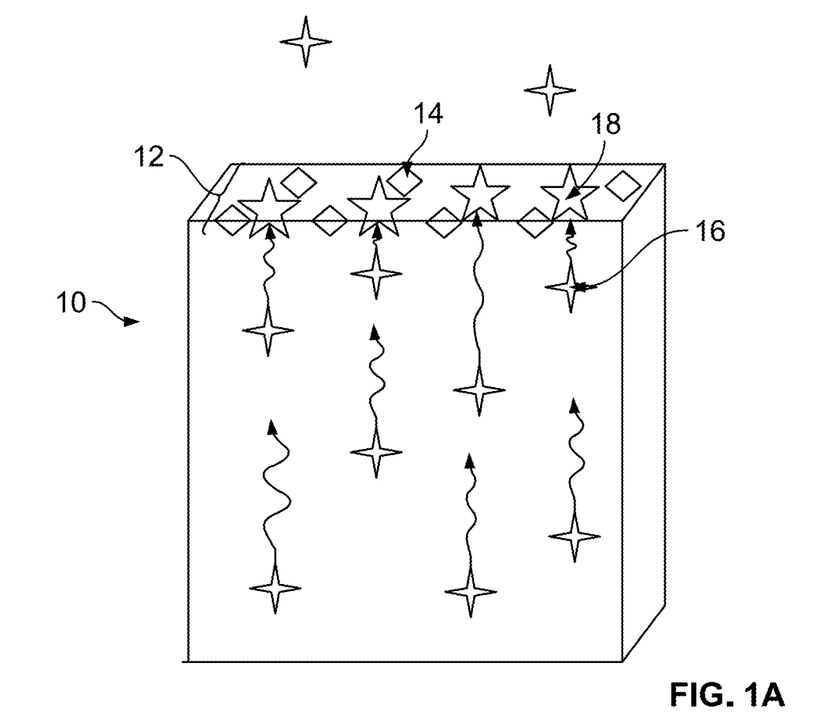
FIG. 1A depicts a schematic view of an example foam article with a coating containing scavengers capable of preventing release of aldehyde from the foam article.
Figure 1B:
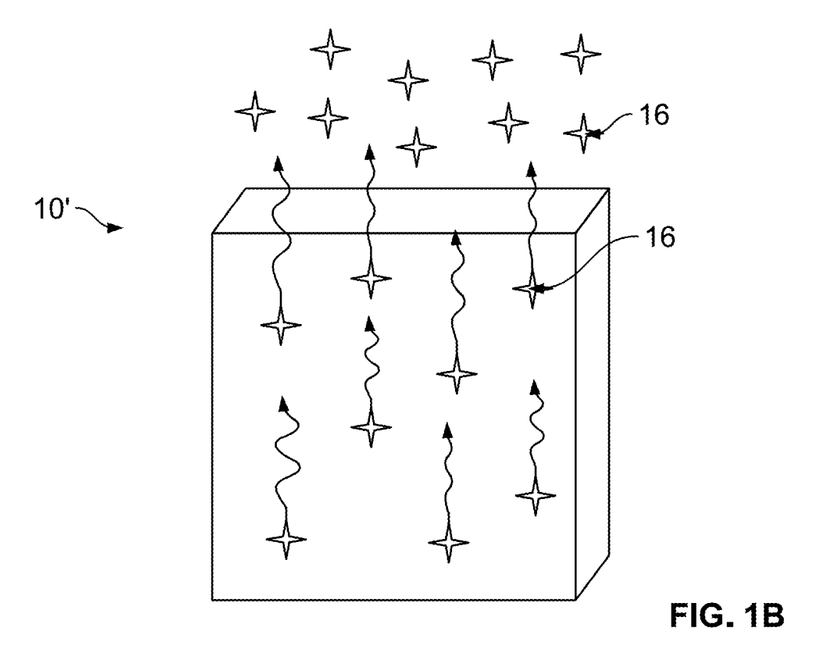
FIG. 1B depicts a schematic view of another foam article releasing aldehyde due to a lack of scavenger-containing coating.
Figure 1C:
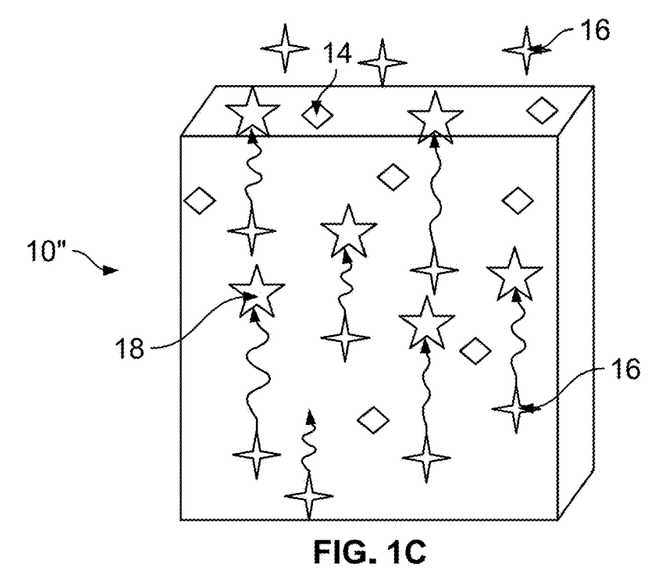
FIG. 1C depicts a schematic view of a yet another foam article with scavengers capable of preventing release of aldehyde incorporated within the foam.

The polyurethane (PUR) foam may contain any polymer composed of organic units jointed by urethane links. PUR is formed by two monomers, an isocyanate and a diol. For example, a reaction between diisocyanate and a diol forming PUR is depicted below:

As FIG. 1A schematically depicts, the method includes coating a top layer of a foam material 10 forming a foam article. The article may be produced by any known method such as molding. The article is thus fully manufactured at the time when the coating 12 is applied onto its surface. The coating process includes application of a solution containing one or more types of scavengers 14 which react with AA 18 that is diffusing from the interior of the article towards the article's surface. The coating 12 is applied onto the outer surface of the foam article. The scavenger 14 reacts with the AA 16 molecules which reach the coating 12, and the chemical interaction produces an aldehyde-scavenger adduct 18. Thus, the coating 12 prevents AA release from the foam material 10 which would be otherwise able to diffuse from within the foam material uninhibited, as is depicted in FIG. 1B. FIG. 1B illustrates a foam material 10' without the coating 12. Additionally, as FIG. 1C shows, a foam material 10", which has a scavenger material 14 mixed in the foam structure, has a lesser effectiveness at the same scavenger loading than the foam material in FIG. 1A. In addition, mixing the scavenger 14 in the foam mixture presents several disadvantages, one of them being modification of mechanical and thermal properties of the foam, but also non-uniform distribution of the scavenger 14 molecules within the foam such that certain portions of the foam may contain insufficient concentration of the scavenger 14 needed for aldehyde capturing while other portions may have higher scavenger 14 concentration than is necessary. Thus, providing a scavenger coating 12 on the outer layer of the foam 10 requires lesser amount of scavenger 14 yielding a more effective result than mixing scavenger 14 within the foam material 10".

The scavenger 14 may be any scavenging material capable of blocking release of AA from within the foam material 10. For example, the scavenger material 14 may be a catalyst reducing AA concentration by converting AA into another chemical, which is less harmful than AA. Preferably, the converted chemical is non-toxic, environmentally friendly, less volatile than AA, easier to capture and trap within the foam than AA, the like, or a combination thereof.

For example, the scavenger 14 may be an amine-group terminated hydrocarbon such as m-xylenediamine (MXDA). MXDA is a colorless liquid, soluble in water, which has had different uses, a prominent one being an epoxy curing agent in the paint and coating industry. The reaction of MXDA with AA is as follows:

The two terminal, primary amines of the difunctional MXDA react with the aldehyde moiety (O=CH) of AA. Each amine nitrogen forms a double bond with an aldehyde group of one AA molecule, producing an imine group. Since MXDA is difunctional, two AA molecules can react with one molecule of MXDA, producing two imine groups and 2 molecules of water as a byproduct.

Another scavenger 14 utilizing the same principal—producing an alternative product from AA by a chemical reaction—may be an amide such as anthranilamide. The reaction of anthranilamide and AA produces water and an organic compound having an unbridged 5- or 6-member having two nitrogen atoms.

The reaction mechanism may contain an additional step, a desaturation reaction in which the bicyclical organic product gives off a dihydrogen molecule yielding a two-ring structured organic compound with a double bond in the second ring:

Various studies suggest that presence of a catalyst may be needed to produce the double bond in the second ring.

Another type of scavenger 14 limits diffusion of AA by forming an inclusion complex with AA. An example of this type of scavenger 14 is alpha-cyclodextrin, a polysaccharide with six glucose units covalently attached end to end via α-1,4 linkages having lipophilic internal structure and hydrophilic exterior. Due to the lipophilic interior of alpha-cyclodextrin, AA molecule can enter the cavity. As the AA molecule penetrates the internal cavity of the scavenger 14, alpha-cyclodextrin encapsulates the AA molecule into its cyclical structure, and hydrogen bonding holds the AA within the cavity without a chemical reaction between the polysaccharide and AA:

Studies have shown that a saturation point for the alpha-cyclodextrin and AA complex occurs at a ratio of one to one. Thus, one molecule of alpha-cyclodextrin can scavenge one molecule of AA. Alpha-cyclodextrin presents a biodegradable scavenger.

The solution may include other components besides the scavenger 14. For example, the solution may be solvent-based, including a polar or non-polar solvent, depending on the type of scavenger 14 used. The solvent may evaporate quickly, have low or zero toxicity, and have other beneficial properties. Example solvents may include alcohols such as isopropanol, ethanol, ethyl ether, benzene, ethyl acetate other organic solvents such as aliphatic compounds, aromatic compounds, ketones, water, or the like.

Alternatively, the solution may contain additional components such as various additives. The additives may serve a plethora of functions, improve the solution itself, or improve characteristics of the foam material the solution will be applied to. For example, the additives may contribute color or opacity, protect the substrate from UV light, increase hardness of the applied layer, act as catalysts, driers, thickeners, stabilizers, texturizers, adhesion promoters, biocides, fungicides, insecticides, algaecides, the like, or a combination thereof. The additive may maintain flexibility, integrity, or both of the coating 12 for an extended period of time after the solvent evaporates. Example additives may include organic or inorganic pigments which may also enable visual control of the solution application on the surface of the foam material.

The amount of scavenger 14 used in the solution may differ, depending on the chemical composition of the foam material, manufacturing conditions, as well as predictable environmental conditions the foam article will be exposed to during use. Example amount may be about less than 0.5, 0.5, 1, 1.5, 2, 2.5, 3, 3.5, 4, 4.5, 5, 5.5, or more than 5.5 wt. %, based on the total composition. The remainder may be a solvent which will evaporate after application to the outer surface of the foam material.

The solution may include one or more types of scavengers. For example, the solution may contain only scavengers which block a release of AA from the foam article by a chemical reaction. Alternatively, the solution may contain only scavengers limiting diffusion of AA by forming an inclusion complex with AA. Alternatively still, both types of scavengers may be included in equal or different amounts. Since effectiveness of the scavengers may change, such as increase or decrease depending on the time elapsed since application, the amount, intensity, and frequency of UV light exposure and oxidative stress, it may be desirable to include more than one type of scavenger in the same coating.

The method may include preparation of the coating by mixing all of the components. At least some of the components may be in the form of a powder. The powder may be mixed with the liquid solvent and/or other components forming a mixture or slurry. The mixture or slurry forming the solution may be applied onto the outer surface of the foam article to form a coating 12. The application of the solution contemplates any process of covering a surface of a substrate with a solution such as painting, spraying, vapor deposition, roll-to-roll coating, printing, dipping, the like, or a combination thereof. The application may be automated or manual. The solution may be dried under ambient temperatures (64 to 77° F., 20 to 25° C.) and pressure (14.7 psi, 1.01325 bar). Alternatively, upon application to the surface of the article, the solution may be exposed to elevated temperatures and/or pressures to increase the speed of the drying process. The elevated temperatures may include any temperature above the ambient temperature named above up to a temperature which would compromise structural integrity of the scavenger.

The method may include tailoring application of the solution onto the foam surface to form a uniform or non-uniform coating 12, as desirable. For example, a greater amount of the solution 12 may be applied onto certain portions of the outer surface of the article in comparison with the remainder of the surface. A greater amount may be applied, for example, to such portion or portions of the article which are most likely to be exposed to oxidative stress and/or UV light. Thus, such portions may be prone to release higher amounts of AA than the remaining portions of the article to be treated, and a higher scavenger concentration may be needed. Example thickness of the coating 12 may be from about 0.1 mm to 5 cm, 1 mm to 3 cm, 0.1 cm to 2 cm. Alternatively, the coating 12 may be only one molecule or several molecules thick. Alternatively still, the coating may be more than 5 cm thick.

Upon evaporation of the solvent, the coating 12 including the scavengers is formed on the outer surface of the foam article. After the coating 12 is formed, the scavengers 14 are capable of limiting release of acetaldehyde. To provide good scavenging results, the coating 12 needs to be adhered to the foam surface such that AA diffusing from within the foam material has to encounter the scavenger-containing coating 12.

EXAMPLES

Eighteen samples of BASF low VOC foam with a scavenger-containing solution were prepared according to the following steps. Eighteen solutions, each containing 5 wt. % scavenger and 95 wt. % isopropanol were prepared. Each solution contained 8.3 g of scavenger and 157.7 g of isopropanol. The total weight of each solution was 166 g. Each solution was sprayed onto a single foam sample. The scavenger loading of each sample was 1 wt. %, based on the total weight of the foam sample with the scavenger coating. The dimensions of each sample were about 380 mm×380 mm×100 mm. All foam samples were stored at ambient temperature (23±2° C., 50%±5% RH) in 100 L PVF bags with PTFE valves. The bags did not allow light to shine through. The 18 bags were tested at 2 weeks, 5 weeks, or 8 weeks according to the Tables 1 and 2 below in accordance with the test method No. 01.12-L-10661 entitled Interior Component Test for Volatile Organic Compounds, an internal Ford test procedure adapted and optimized from various testing methods from a variety of sources.

TABLE 1

Number and type of foam samples tested

|  | 18 Foam Blocks | | Foam Blocks 1-6 Tested | | Foam Blocks 17-12 Tested | | Foam Blocks 13-18 Tested | |
| --- | --- | --- | --- | --- | --- | --- | --- | --- |
| Elapsed Time | 0 | | 2 weeks | | 5 weeks | | 8 weeks | |
| Oxygen Atmosphere | No | Yes | No | Yes | No | Yes | No | Yes |
| Control - No Scavenger Present | 3 | 3 | 3 | 3 | 3 | 3 | 3 | 3 |
| Scavenger present - Anthranilamide | 2 | 2 | 1 | 1 | 0 | 1 | 1 | 0 |
| Scavenger Present - Alpha-cyclodextrin | 2 | 2 | 0 | 1 | 1 | 1 | 1 | 0 |
| Scavenger Present - MXDA | 2 | 2 | 0 | 1 | 0 | 1 | 2 | 0 |

TABLE 2

| Sampling conditions | | | |
|---|---|---|---|
| Sampling Bag Volume | 100 L | Sampling Flow Rate TD tube | 200 ml/min |
| N₂ Volume in the Sampling Bag | 60 L | Sampling Volume TD tube | 3 L |
| Oven Heating Temperature | 65 ± 2° C. | Sampling Flow Rate DNPH cartridge | 800 ml/min |
| Heating Time | 2 hours ± 10 min | Sampling Volume DNPH cartridge | 10 L |

TABLE 3

Levels of AA detected in the 18 test bags in 2 weeks, 5 weeks, and 8 weeks after application of the coating onto the foam samples and storing of the samples in the bags

| | AA detected in 2 Weeks [µg/m³] | AA detected in 5 Weeks [µg/m³] | AA detected in 8 Weeks [µg/m³] |
|---|---|---|---|
| Original | 677 | 677 | 677 |
| No Scavenger, No Oxygen Atmosphere | 278 | 280 | 701 |
| No scavenger, Oxygen Atmosphere | 260 | 453 | 361 |
| Anthranilamide, No Oxygen Atmosphere | 312 | 200 | 207 |
| Anthranilamide, Oxygen Atmosphere | 324 | Not Measured | Not measured |
| Alpha-cyclodextrin, No Oxygen Atmosphere | Not Measured | 525 | 586 |
| Alpha-cyclodextrin, Oxygen Atmosphere | 0 | 277 | Not Measured |
| MXDA, No Oxygen Atmosphere | Not Measured | Not Measured | 155.5 |
| MXDA, Oxygen Atmosphere | 69 | 238 | Not Measured |

Results of the testing are provided in Table 3 above. As the test data demonstrate, the foam samples exposed to oxygen atmosphere released higher amounts of AA than samples stored in nitrogen without exposure to oxygen. Both MXDA and alpha-cyclodextrin reduced AA levels in 2 weeks, 5 weeks, and 8 weeks. The foam samples treated with alpha-cyclodextrin did not release any AA in 2 weeks, yet the effectiveness of alphacyclodextrin was lower with passing time. On the other hand, anthranilamide seemed less effective at 2 weeks than at 5 and 8 weeks, especially when measured on the foam samples which were not exposed to oxygen atmosphere.

Figure 2A:
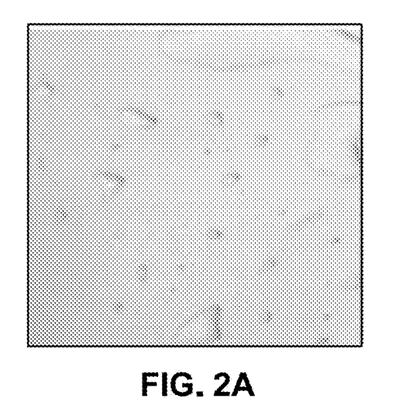
FIGS. 2A-2D show foam article surfaces with and without scavenger-containing coating.
Figure 2B:
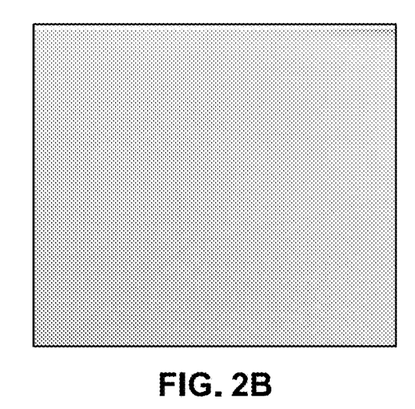
Figure 2C:
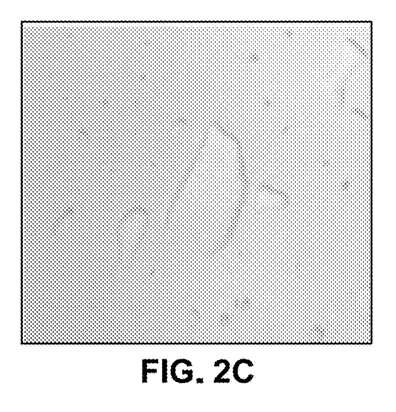
Figure 2D:
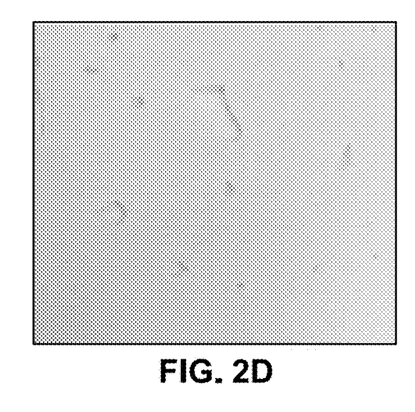

The observed physical properties of the foam samples with the coatings containing one of the three different scavengers described above is provided herein. The coating including anthranilamide formed a visible, whitish coating layer. Some loose, soft, fine powder was present. The loose powder was easily removable on contact. The coating including alpha-cyclodextrin formed a visible, white powder coating. Some loose powder was present; the powder was easily removable on contact. The powder was coarse and grainy. The MXDA coating formed a whitish, matte skin which was less soft than the foam skin. FIG. 2A depicts a foam sample without the scavenger coating. FIGS. 2B-2D show foam samples with the scavenger coatings; 2B shows a coating including anthranilamide, 2C shows a coating including alpha-cyclodextrin, and 2D shows a coating including MXDA.

In an alternative embodiment, the foam may be treated with a scavenger coating during production. For example, a solution, as described above, containing one or more scavengers named above may be added to a mold used to form the foam article. The solution slurry may be applied by any technique named above, to the inner surface of a mold prior to and/or during the foam making process on the production line. The solution may be applied more than once on the same mold. Additionally, the solution may have to be adjusted depending on the dimensions and shape of the mold. For example, the solution may be too thin, resulting in accumulation of the solution on the bottom of the mold as the solution gravitates towards the lowest portions of the mold. A resulting layer of the coating in the elevated portions of the mold may be too thin. Repeated application of the solution to the elevated portions of the mold, thickening the solution, or both may be desirable if uniform thickness of the coating 12 is to be achieved. Yet, in some embodiments, thinning the solution may be desirable. For example, if one or more portions of the molded article are expected to have a higher exposure to the UV light and oxygen during use, it may be beneficial to provide a thicker layer of the scavenger coating 12 to the one or more portions.

The method may include heating the mold prior to application of the scavenger coating. The mold may be heated to a temperature above ambient temperature of 18° C. (64° F.) to about 260° C. (500° F.) or more, depending on the foam material and type of foam forming process. The solution may be allowed to dry completely. The solution may form a powder coating on the mold surface.

In one or more embodiments, the solution may be mixed with a mold release agent. The mold release agent may be any type of a mold release agent as long as it functions as an effective barrier between the foam material to be molded and the mold. The release agent may not mix with the foam. The mold release agent may be a hydrophobic material with no open hydroxyl function. An example mold release agent may be a complex wax.

Alternatively, a liner may be provided between the mold release agent applied to the inner surface of the mold and the scavenger coating. The liner may inhibit any reaction of the scavenger coating with the mold release agent. The liner should be able to isolate the scavenger coating from the mold release agent while still enable the mold release agent to perform its function. An example liner may be a polyolefin film such as a polyethylene film. An alternative liner may contain one or more types of zeolites including the one or more types of scavengers. The zeolites would be capable of capturing the scavengers, holding the scavengers before their release onto the outer surface of the formed foam article, yet at the same time, the zeolites would prevent premature release of the scavengers so that the scavengers would be prevented from reacting with the mold release agent.

In at least one embodiment, the one or more scavengers may be encapsulated in micelles. Since the mold release agent is hydrophobic, and the scavengers are hydrophilic, a micelle structure could be formed to capture the scavengers, prevent the scavenger from dissolving directly with the mold release agent, or segregating into discrete droplets due to immiscibility, and enable even delivery of scavenger material to the surface of the foam material which is likewise hydrophobic. A fraction of the mold release agent and the micelles containing a known number of molecules of the hydrophilic scavenger may locally interact and may be transferred to the surface of the foam during manufacture. The subsequent micelle in contact with the polymer may be promoted to open, and the scavenger may become available to react into the polymer, if it contains an alcohol functionality as a molecular ligand, or to become associated through hydrogen (weak bonding) to the neighboring organic polymer structure and be available to react with AA or other aldehydes as its normal function.

After application of the scavenger-containing solution, a foam material is delivered into the mold, and a typical casting process ensues. The foam hardens and forms a top layer or crust. The scavenger coating adheres to the top layer having a thickness and properties described above.

In a yet alternative embodiment, the one or more scavengers may be incorporated into the top layer of the formed foam during the foam forming process. The method utilizes reaction mechanism of the PUR foam formation. Since a PUR foam is formed by reacting an isocyanate with a polyol, the scavenger-containing solution may act as the polyol. The scavengers named above may be utilized directly or may have to be modified to contain one or more hydroxyl groups. Alpha-cyclodextrin already contains several hydroxyl groups so a modification may not be needed. MXDA could be modified by adding a hydroxyl group, for example an alcohol terminated sidechain, onto the -para position of its ring. Likewise, anthranilamide could be modified to provide one or more hydroxyl groups onto the -ortho or -meta positions of the ring. A catalyst could be added to the scavenger-containing polyol to catalyze the reaction once the scavenger-containing polyol is added to the isocyanate in the mold.

The scavenger-containing polyol may be applied to the inner surface of the mold prior to application of the isocyanate. The scavenger-containing polyol may be allowed to react with the isocyanate such that the scavenger is incorporated into the surface of the cast foam. Alternatively, additional polyol which is scavenger-free may be added to form majority of the mass of the foam while only a small portion on the outer surface of the foam would contain the scavengers preventing release of AA. Thus, more than one type of polyol in the same or different amounts may be incorporated.

Figure 3:
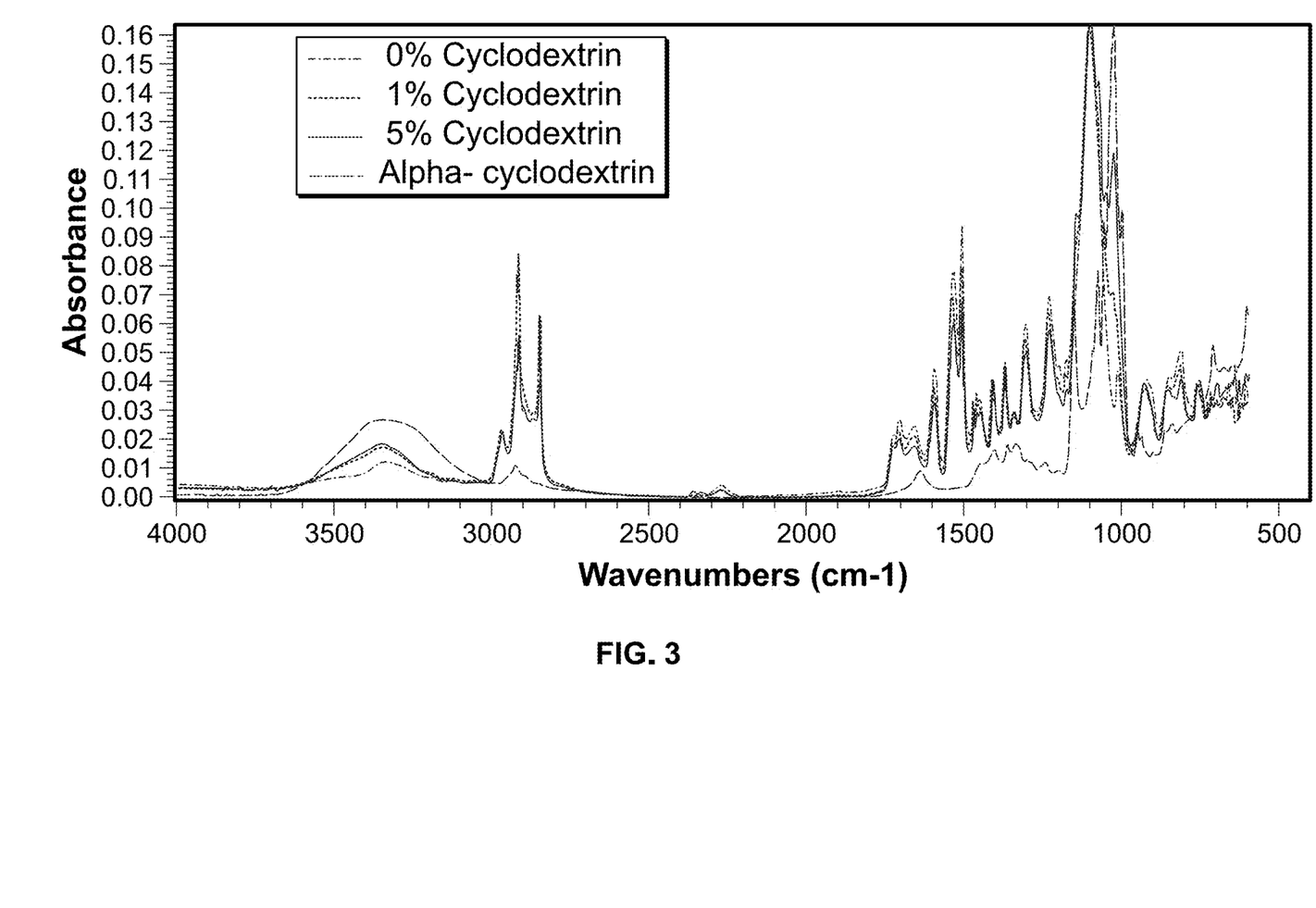
FIGS. 3 and 4 show Fourier transform infrared spectroscopy (FTIR) results for outer surfaces of a foam article formed by reacting isocyanate with a scavenger-containing polyol.
Figure 4:
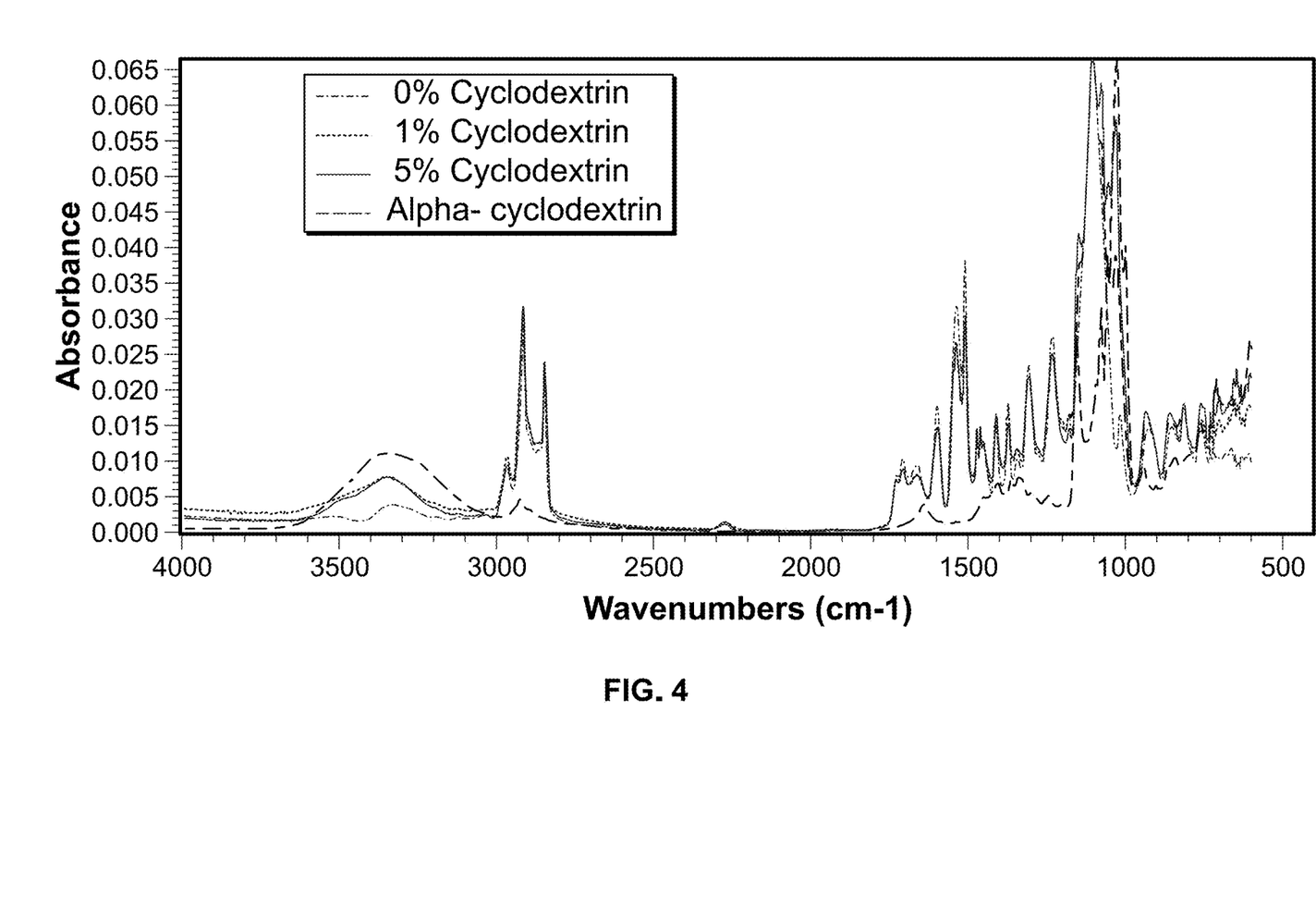

FIGS. 3 and 4 show FTIR results for PUR foam samples which were prepared according to the following method. A casting mold was heated to about 65° C. (150° F.), a complex wax was added to the inner surface of the mold as a release agent. Subsequently, a slurry of isopropyl alcohol and 1 wt. % of alpha-cyclodextrin, serving as the polyol, was painted on top of the mold release agent. The slurry was left to dry until a white powder coating was formed. Isocyanate was poured into the mold, the mold was closed, and the mixture was left to react. After the foam was cast, the mold was opened. A white crust on the outer surface of the foam article was observed. FTIR was used to evaluate presence of alpha-cyclodextrin on the outer surface of the foam article. The FTIR results show that alpha-cyclodextrin was present on the surface of the foam. Specifically, FIG. 3 shows that alpha-cyclodextrin was detectable in the upper layer of the foam, and FIG. 4 illustrates the same for the bottom layer of the foam.

The scavenger-containing polyol may be reacted with isocyanate to form a layer of a relatively small thickness, a thin foam layer. The thin foam layer could be laid over and/or attached to an upper layer of an article with a potential to release AA. Covering the outer surface or a plurality of outer surfaces of such an article partially or fully would prevent release of AA through the thin foam layer including scavengers. The thin foam layer could be a film. The thickness of the film could be fractions of nanometer to several micrometers or more. The thin foam layer could be attached to an upper layer of the article by sewing, heat laminating, adhesively, the like, or a combination thereof. Example articles with a potential to release AA may include vehicle seats or vehicle components containing fabrics such as fabrics having flame retardants, or plastic components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of forming a vehicle interior foam article, the method comprising:
    applying a mold release agent onto an inner surface of a mold;
    delivering a solution comprising aldehyde scavenger(s) to the mold such that a reaction and contact of the aldehyde scavenger(s) with the mold release agent is prevented;
    delivering a foam material into the mold; and
    casting the article.

2. The method of claim 1, further comprising inserting a liner between the mold release agent and the solution to prevent any reaction of the aldehyde scavenger(s) with the mold release agent.

3. The method of claim 2, wherein the liner is a plastic film.

4. The method of claim 2, wherein the liner contains one or more types of zeolites capable of capturing the aldehyde scavenger(s).

5. The method of claim 1, further comprising encapsulating the aldehyde scavenger(s) in micelles.

6. The method of claim 1, wherein the aldehyde scavenger(s) are capable of trapping aldehyde within the article and preventing aldehyde from being released into cabin air.

7. The method of claim 1, wherein the aldehyde is acetaldehyde.

8. The method of claim 1, wherein the aldehyde scavenger(s) include an amide, a polysaccharide, a diamine, or a combination thereof.

9. The method of claim 1, wherein the aldehyde scavenger(s) include cyclical structures configured to form inclusion complexes with aldehyde.

10. The method of claim 1, wherein the aldehyde scavenger(s) include glucose units.

11. The method of claim 1, wherein the mold release agent comprises a hydrophobic material with no open hydroxyl function.

12. The method of claim 1, further comprising heating the mold prior to the applying step.

13. The method of claim 1, wherein the mold release agent is a complex wax.

* * * * *